United States Patent [19]

Uchihori

[11] Patent Number: 4,961,135
[45] Date of Patent: Oct. 2, 1990

[54] TRANSLATION LOOKASIDE BUFFER CONTROL SYSTEM

[75] Inventor: Ikuo Uchihori, Fuchu, Japan

[73] Assignee: Kabushiki Kaisha Toshiba, Kawasaki, Japan

[21] Appl. No.: 137,082

[22] Filed: Dec. 23, 1987

[30] Foreign Application Priority Data

Dec. 24, 1986 [JP] Japan ................................ 306316/86

[51] Int. Cl.⁵ ............................................ G06F 12/08
[52] U.S. Cl. ................................. 364/200; 364/243.4; 364/254.3; 364/256.3
[58] Field of Search ... 364/200 MS File, 900 MS File

[56] References Cited

U.S. PATENT DOCUMENTS

| | | | |
|---|---|---|---|
| 4,373,179 | 2/1983 | Katsumata | 364/200 |
| 4,521,846 | 6/1985 | Scalzi et al. | 364/200 |
| 4,654,777 | 3/1987 | Nakamura | 364/200 |
| 4,731,740 | 3/1988 | Eguchi | 364/200 |
| 4,802,084 | 1/1989 | Ikegaya et al. | 364/200 |

Primary Examiner—Michael R. Fleming
Assistant Examiner—Debra A. Chun

Attorney, Agent, or Firm—Finnegan, Henderson, Farabow, Garrett, and Dunner

[57] ABSTRACT

A virtual address register for storing a virtual address is arranged in a translation lookaside buffer control system. An artihmetic operation circuit is coupled to the virtual address register and performs adding, EX-ORing, and the like of the contents of two first fields which do not overlap each other. A TLB address register is coupled to the arithmetic operation circuit and the virtual address register, and stores the contents of a second field which does not overlap those of the first fields and output data from the arithmetic operation circuit. A translation lookaside buffer (TLB) is coupled to the TLB address register. The TLB is addressed by the content of the address register, stores address translation data in each entry, and translates a virtual address into a physical address, at high speed. A controller is coupled to the virtual address register and the TLB address register, and determines whether a virtual address specified by the address translation data stored in the entry designated by the contents of the TLB address register coincides with the virtual address stored in the virtual address register. The controller replaces the contents of a corresponding entry of the TLB when the virtual addresses do not coincide with each other.

14 Claims, 15 Drawing Sheets

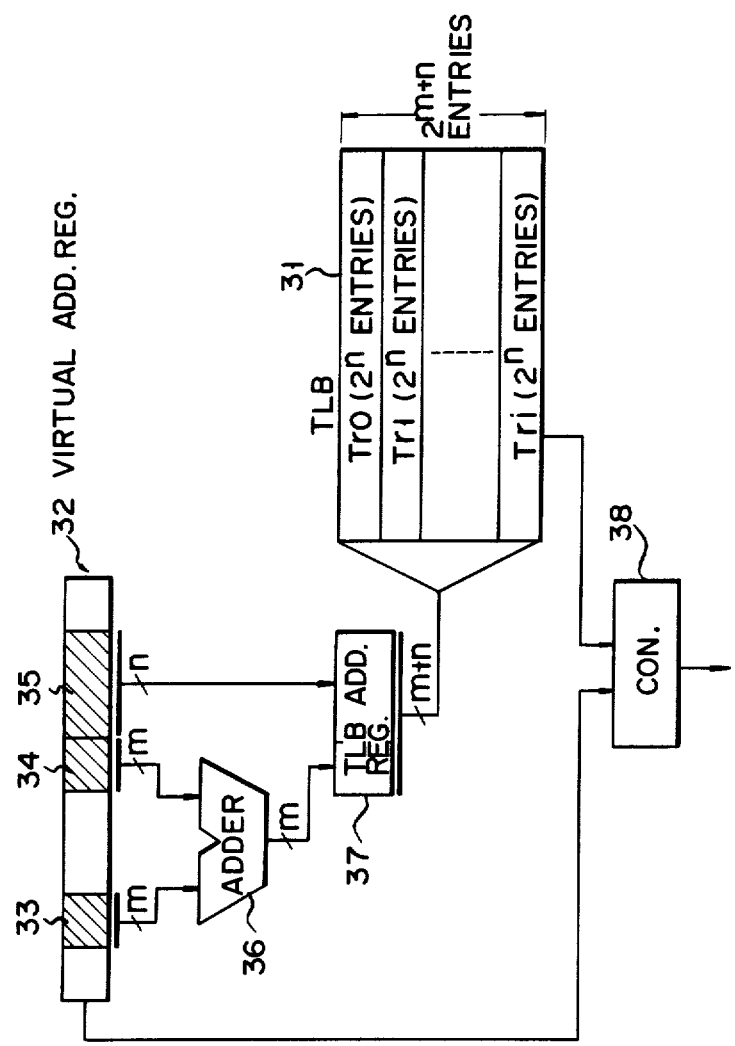
F I G. 5

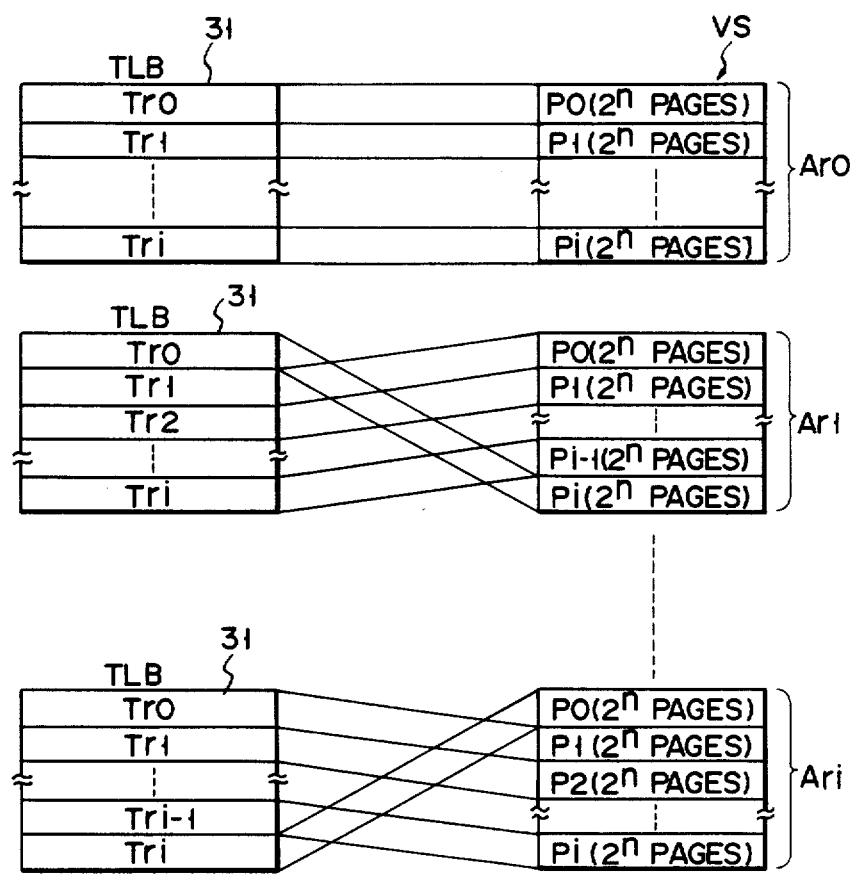
F I G. 6

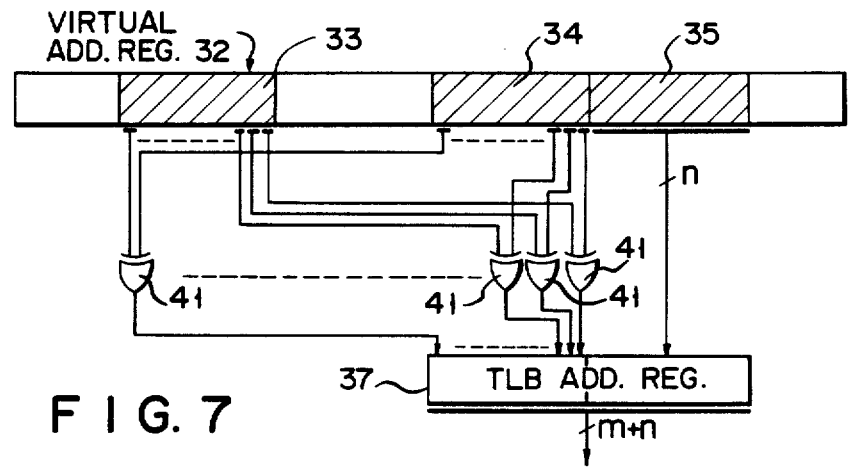
F I G. 7
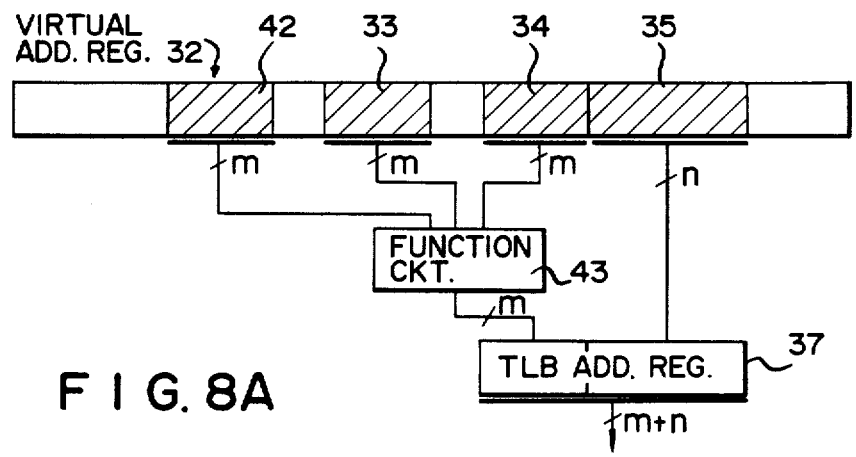
F I G. 8A
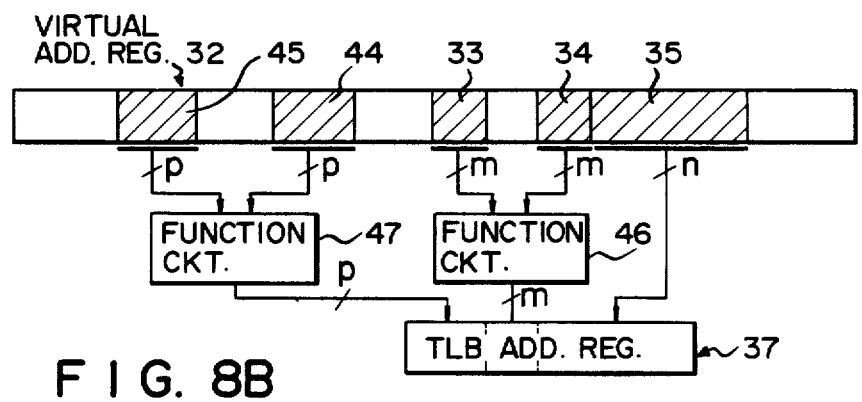
F I G. 8B

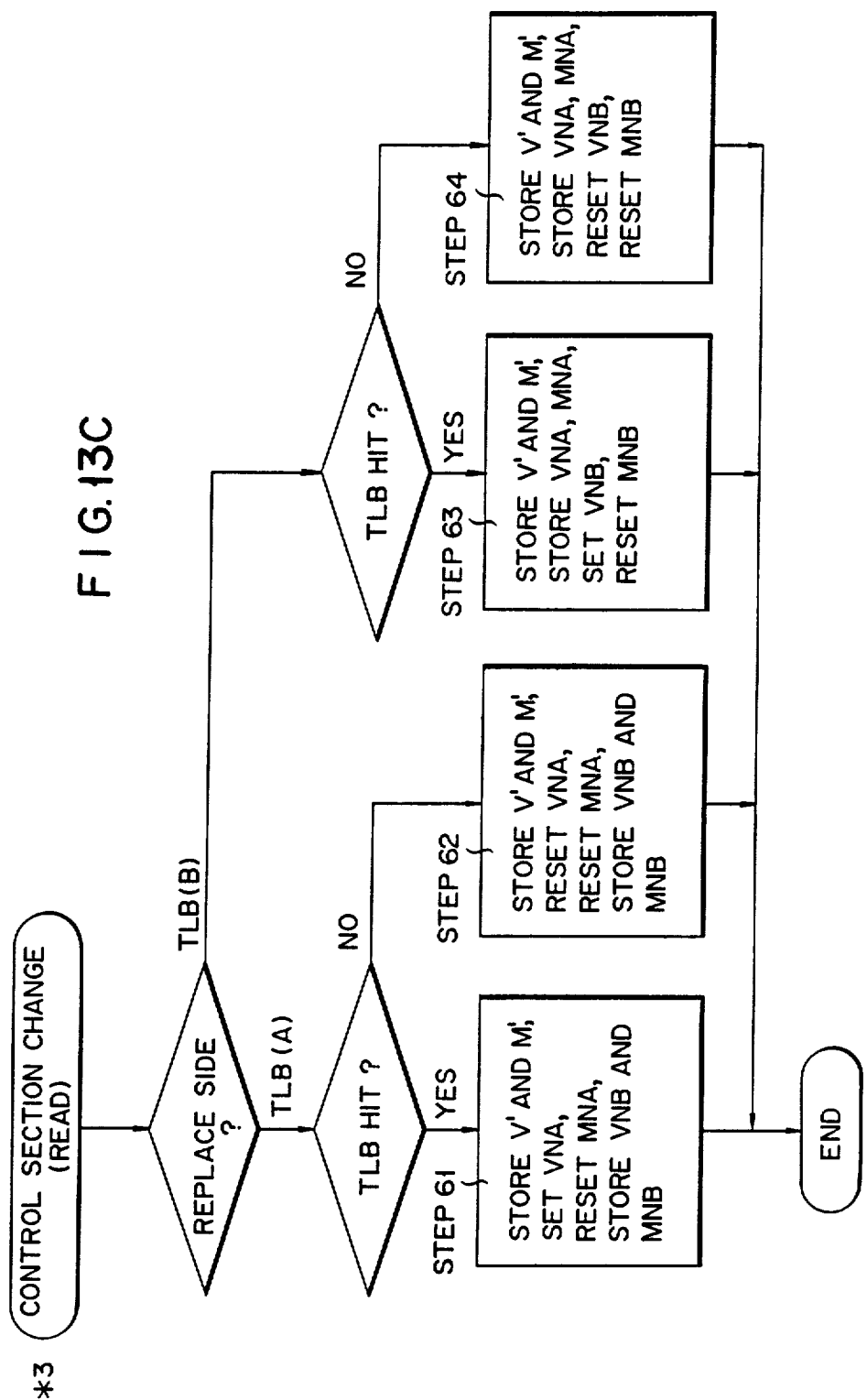

TRANSLATION LOOKASIDE BUFFER CONTROL SYSTEM

BACKGROUND OF THE INVENTION

The present invention relates to a computer system having an address translation buffer and, more particularly, to the control system of a translation lookaside buffer.

In general, a computer system utilizing a virtual memory control system includes a translation lookaside buffer (to hereinafter referred to as a TLB). The TLB is used for the high-speed translating of a virtual address into a physical address (a real address), and stores a pair of virtual and physical addresses (address translation data) in each entry. In general, part of the virtual address is separated and used as an address (a TLB address) for referring to the TLB. Methods of separating part of the virtual address, i.e., the method of referring to the TLB can be categorized into two systems. A first system will now be described, with reference to FIG. 1.

In FIG. 1, TLB 11 having $2^{m+n}$ entries. A virtual address to be translated into a physical address is stored in address register 12. The content of (m+n)-bit field 13 is loaded in TLB address register 14. The content of TLB address register 14 is used for designating entries in TLB 11.

FIG. 2 shows a state wherein TLB 11 in FIG. 1 is utilized. In virtual memory (address) space VS, each of virtual memory areas $A_{p0}$ to $A_{pi}$ (i is determined by the size of virtual memory space VS) corresponds to the entire area of TLB 11. Therefore, the first system is efficient when a large continuous memory area is accessed, e.g., when a single program is to be executed. However, when areas to be accessed are distributed in areas $A_{p0}$ to $A_{pi}$, as indicated by hatched portions in FIG. 2, a TLB hit rate is decreased. As a result, the frequency of occurrence of replace operation is increased, resulting in poor efficiency. Such a state occurs, for example, when a program is executed in which code portions or data portions are distributed in a plurality of areas in virtual memory space VS, or when a plurality of programs are parallelly executed.

A second system will be described with reference to FIG. 3. In FIG. 3, TLB 21 having entry blocks $T_{q0}$, $T_{q1}$, ... $T_{qi}$ (i=$2^m$−1) constituted by $2^n$ entries is used. A virtual address to be translated is stored in virtual address register 22. The contents of m-bit field 23 and n-bit field 24, which is discontinuous with field 23, in virtual address register 22 are linked together and loaded in TLB address register 25. TLB 21 is accessed by the content of TLB address register 25, and hence an entry in TLB 21 is designated. The second system is disclosed, e.g., in FIG. 1 of U.S. application Ser. No. 749,866, filed (patented) on June 28, 1985.

FIG. 4 shows a state wherein TLB 21 in FIG. 3 is utilized. Areas $A_{q0}$ to $A_{qi}$ obtained by dividing virtual memory space VS by i+1 (i=$2^m$−1) correspond to entry blocks $T_{q0}$ to $T_{qi}$ in TLB 21, respectively. More specifically, for example, each area of $2^n$ pages obtained by dividing area $A_{q0}$ by j (j is determined by the size of $A_{q0}$) corresponds to entryblock $T_{q0}$ Therefore, the second system is very efficient when a program in which discontinuous areas in virtual memory space VS are accessed is to be executed, or when a plurality of programs are parallelly executed. However, the second system is very inefficient when a large continuous memory area in the virtual memory space is required. For example, when the entire area $A_{q0}$ in virtual memory space VS shown in FIG. 4 is to be accessed, only entry block $T_{q0}$ of TLB 21 is used, resulting in poor efficiency.

As described above, the conventional system capable of efficiently accessing a large continuous area in the virtual memory space is inefficient when a plurality of discontinuous areas in the virtual memory space are to be accessed, and the conventional system capable of efficiently accessing a plurality of discontinuous areas in the virtual memory space is inefficient when a large continuous area in the virtual memory space is to be accessed.

SUMMARY OF THE INVENTION

It is an object of the present invention to provide a TLB control system which can efficiently utilize a translation lookaside buffer (TLB) not only when a large continuous area in a virtual memory space is accessed, but also when a plurality of discontinuous areas in the virtual memory space are accessed.

In order to achieve the above object, a TLB control system of a computer using a virtual memory control system according to the present invention comprises:

a virtual address register for storing a virtual address;

an arithmetic operation circuit, coupled to the virtual address register, for receiving contents of at least two first fields, which do not overlap each other, in said virtual address register and performing a predetermined operation with respect to the received contents;

a TLB address register, coupled to the arithmetic operation circuit and the virtual address register, for storing linked data comprising output data from the arithmetic operation circuit as upper bits and storing the content of a second field located at a position lower than the lowermost field of the first fields of the virtual address register as lower bits;

a translation lookaside buffer (TLB) coupled to the TLB address register and adapted to be addressed by the content of the TLB address register and to store address translation data for translating a virtual address into a physical address in each entry;

a main memory for storing data for translating the virtual address into the physical address;

a determination circuit, coupled to the TLB and the virtual address register, for determining whether a virtual address specified by the address translation data stored in the entry designated by the content of the TLB address register coincides with the virtual address stored in the virtual address register; and replace means, coupled to the determination circuit, the TLB, and the main memory, for reading out data corresponding to the virtual address from the main memory and replacing the address translation data stored in an entry of the TLB designated by the content of the TLB address register when the determination circuit detects that the virtual addresses do not coincide with each other.

According to a TLB control system of the present invention with the above-described arrangement, the TLB is accessed by linked data of the operation result of the first fields and the content of the second field. For this reason, for example, when a virtual address is logically constituted by a segment number (SN) and a page number (PN), if the segment number does not change very often while the page number changes, the TLB can be efficiently used by appropriately selecting the first fields. Similarly, when the segment number changes often over time while the content of the upper bits of the page number does not change very often, a TLB hit rate can be increased. Therefore, high speed translation of an address can be performed not only when a large continuous area in a virtual memory space must be efficiently accessed, but also when a plurality of discontinuous areas in the virtual memory space must be accessed.

BRIEF DESCRIPTION OF THE DRAWINGS

FIG. 5 is a view for explaining an arrangement of a main part of a TLB control system according to an embodiment of the present invention;

FIG. 6 is a view illustrating a state wherein a TLB shown in FIG. 5 is utilized;

FIGS. 7, 8A, and 8B are views showing modifications of the TLB control system according to the embodiment of the present invention in FIG. 5;

DETAILED DESCRIPTION OF THE PREFERRED EMBODIMENT

Figure 1:
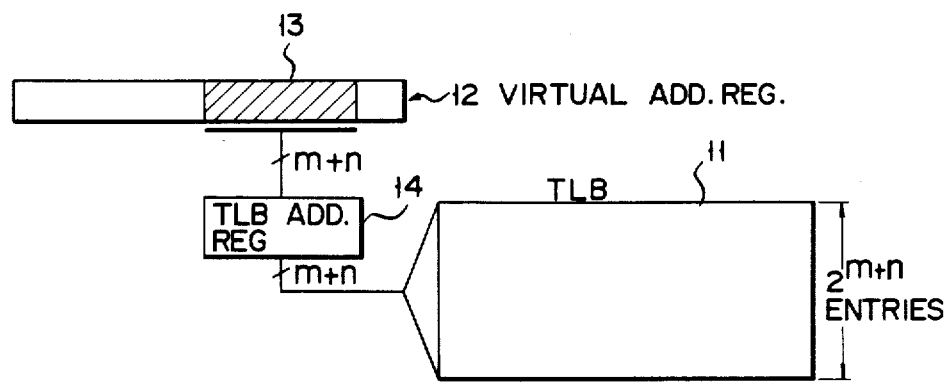
FIG. 1 is a view for explaining an arrangement of a main part of a conventional TLB control system.
Figure 2:
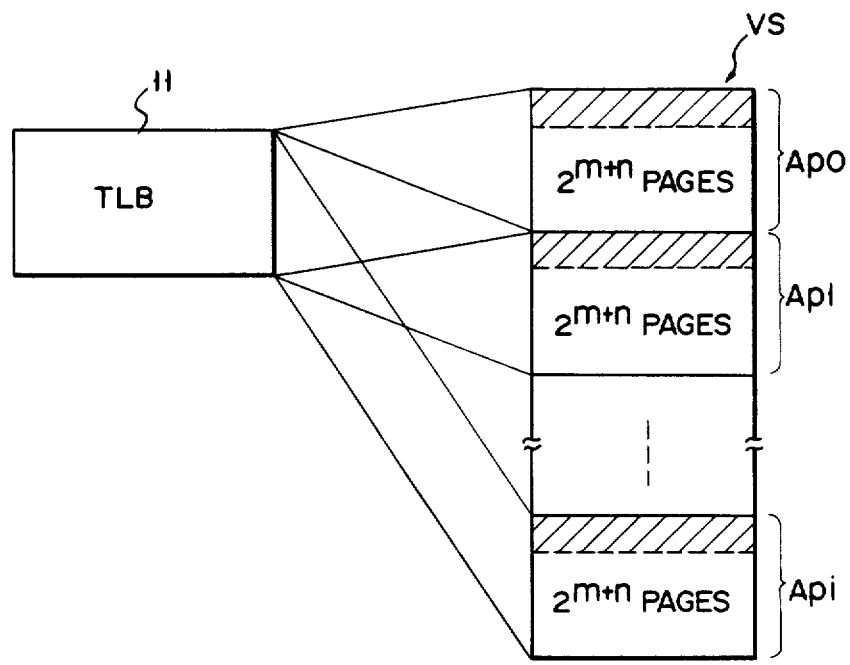
FIG. 2 is a view illustrating a state wherein a TLB shown in FIG. 1 is utilized.
Figure 3:
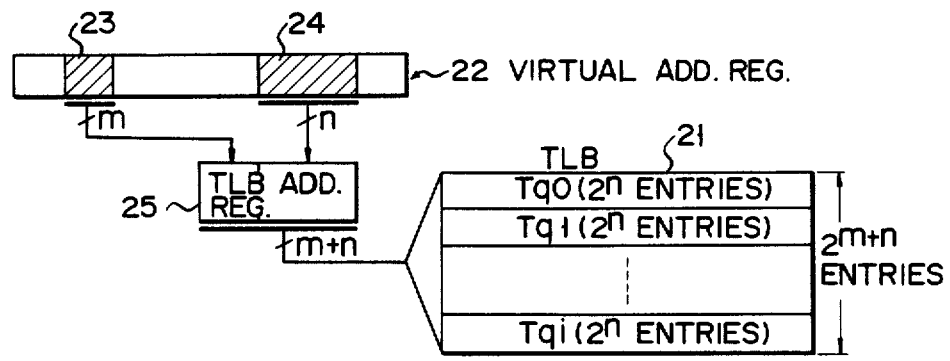
FIG. 3 is a view for explaining an arrangement of a main part of another conventional TLB control system.
Figure 4:
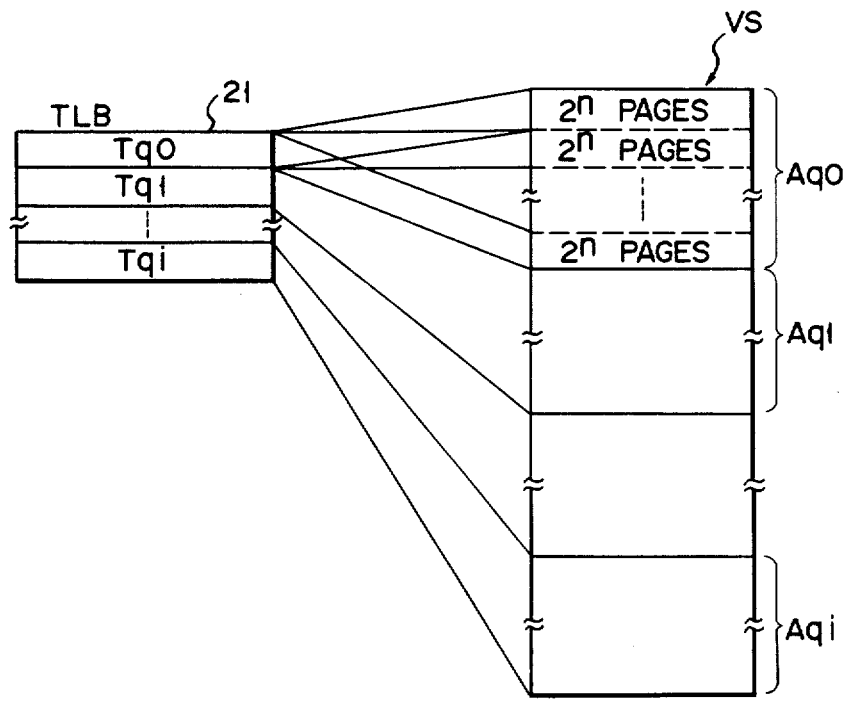
FIG. 4 is a view illustrating a state wherein a TLB shown in FIG. 3 is utilized.

An arrangement and operation of a main part of a virtual memory control system according to an embodiment of the present invention will be described below with reference to FIG. 5.

In FIG. 5, a virtual address to be translated is stored in virtual address register 32. The contents of fields 33 to 35 in virtual address register 32 are used for designating an entry of TLB 31. Field 33 has m bits, field 34 has m bits, and field 35 has n bits (m and n are positive integers). Field 33 is located at an upper position of field 34, which is, in turn, located at an upper position of field 35. Field 33 is discontinuous with field 34, whereas field 34 is continuous with field 35. The contents of fields 33 and 34 in virtual address register 32 are supplied to adder 36. Output data from adder 36 is supplied to TLB address register 37. The content of field 35 in virtual address register 32 is also supplied to TLB address register 37. TLB address register 37 has (m+n) bits. The result calculated by adder 36 is stored in the upper m bits of the field in TLB address register 37. The content of field 35 in virtual address register 32 is stored in the lower n bits of the field in TLB address register 37. The content (=TLB address) is used for designating an entry in TLB 31. TLB 31 has entry blocks $T_{r0}$, $T_{r1}$, ... $T_{ri}$ (i=$2^m$−1), each constituted by 2n entries. A pair of addresses (address translation data), i.e., a virtual address and a corresponding physical address is stored in each entry of TLB 31. The contents of virtual address register 32 and the entry at the TLB address in TLB 31 are supplied to controller 38.

The operation of TLB control system shown in FIG. 5 will be described below. Assume that a virtual address to be translated is set in virtual address register 32. The contents of fields 33 and 34 in virtual address register 32 are added by adder 36. The result (m bits) calculated by adder 36 is loaded in the upper m bits of the field in TLB address register 37. The content (n bits) of field 35 in virtual address register 32 is loaded in the lower n bits of the field in TLB address register 37. The content (TLB address) in the (m+n) bits of TLB address register 37 are supplied to TLB 31 to address TLB 31. An entry designated by the TLB address is referred.

Controller 38 reads out the virtual address stored in the entry designated by the TLB address and the virtual address stored in virtual address resister 32 to determine whether they coincide with each other. When the virtual address in the entry and the virtual address stored in virtual address register 32 coincide with each other, controller 38 outputs a signal representing a "TLB hit". In response to the signal, a memory area defined by the physical address stored in the entry is accessed by a CPU or the like (not shown). When the virtual address in the entry and the virtual address stored in virtual address register 32 do not coincide with each other, controller 38 outputs a signal representing a "TLB mishit". In response to the signal, the content in TLB 31 is replaced. More specifically, a pair of addresses, i.e., a virtual address and a corresponding physical address are read out from a main memory (not shown), and loaded in the corresponding entry in TLB 31. Upon replacement, controller 38 determines again whether the virtual address stored in virtual address register 32 and the virtual address stored in the entry coincide with each other. When they coincide with each other, a memory area defined by a physical address stored in the entry is accessed.

In this embodiment, TLB 31 is referred by the linked data of the sum of the contents of fields 33 and 34, and the content of field 35. For this reason, for example, when the content of field 33 does not change while a virtual address changes within the range of fields 34 and 35, every time the content of field 34 is incremented by one, the next upper $2^n$ entries in TLB 31 are designated ($T_{r0}$ is designated after $T_{ri}$) Therefore, when a large continuous area in virtual memory space VS must be accessed, e.g., when a single program is to be executed, a replace rate in TLB 31 is decreased. Similarly, when the content of field 34 does not change while a virtual address changes within the range of fields 33 and 35, every time the content of field 33 is incremented by one, the next upper $2^n$ entries in TLB 31 are designated. Therefore, when a plurality of discontinuous areas in virtual memory space VS is to be accessed, a replace rate in TLB 31 is decreased.

The above operation will be described from a more general viewpoint. FIG. 6 shows a state wherein TLB 31 is utilized. Assume that areas $A_{r0}$ to $A_{ri}$ are obtained by dividing virtual memory space VS by i+1 (=$2^m$) Each of $A_{r0}$ to $A_{ri}$ corresponds to the area of TLB 31. Assume that $2^n$-page areas $P_0$, $P_1$, ... $P_i$ can be obtained by dividing each of areas $A_{r0}$ to $A_{ri}$ in virtual memory space VS by j. A value of j is determined by the size of each of areas $A_{r0}$ to $A_{ri}$. FIG. 6 shows a case wherein j=i. When $2^n$-page areas $P_{i+1}$, $P_{i+2}$, ... $P_{2i+1}$ succeeding $P_i$ are present in area $A_{r0}$, they correspond to entry blocks $T_{r0}$, $T_{r1}$, ... $T_{ri}$ as in the case of $P_0$, $P_1$, ... $P_1$. In addition, areas $P_0$, $P_1$, ... $P_i$ in area $A_{r1}$ correspond to entry blocks $T_{r1}$, $T_{r2}$, ... $T_{ri}$, and $T_{r0}$ in TLB 31, respectively. Similarly, $2^n$-page areas $P_0$, $P_1$, ... $P_{i-1}$, and $P_i$ correspond to entry blocks $T_{ri}$, $T_{r0}$, $T_{r1}$, ... $T_{ri-1}$ in TLB 31, respectively. According to the above embodiment, the correspondence between each of $2^n$-page areas $P_0$ to $P_i$ in areas $A_{r0}$ to $A_{ri}$ obtained by dividing virtual memory VS by i and each of entry blocks $T_{r0}$ to $T_{ri}$ can be shifted by one entry block every time the i divided areas are shifted by one area. Therefore, when a large continuous area in virtual memory space VS is to be accessed, e.g., when the entire area of area $A_{r0}$ is to be accessed, TLB 31 can be efficiently utilized. Although only one TLB 31 is used in the system, in order to facilitate understanding of the operation, FIG. 6 shows TLB 31 corresponding to each of areas $A_{r0}$ to $A_{ri}$ in virtual memory space VS.

For example, the lower (the least significant) m bits of a segment number, the upper m bits of a page number, and the lower n bits of the page number can be stored in fields 33, 34, and 35, respectively. Similarly, for example, the upper m bits of a segment number, the lower m bits of the segment number, and all bits of a page number can be stored in fields 33, 34, and 35, respectively. Selection of contents to be stored in the fields is not limited to the above arrangements, but can be arbitrarily changed according to a format of virtual address, a type of program to be executed, and the like.

In FIG. 5, the contents of fields 33 and 34 are added by adder 36. The present invention is not limited to this, but various types of operation circuits can be used in place of adder 36. For example, an EX OR circuit, an OR circuit, an AND circuit, a NAND circuit, a NOR circuit, or an operation element such as a subtracting circuit can be used. However, TLB 31 is preferably operated at a high speed. Therefore, a high speed operation circuit is required.

It is desirable that as shown in FIG. 7, EX OR gates 41 for example, be used in place of adder 36. In this case, corresponding bits are input to EX OR gates 41, respectively, and m-bit outputs from EX OR gates 41 are supplied to the upper m bits of TLB address register 37. In the case shown in FIG. 7, the entries of TLB 31 can be efficiently used. However, unlike in the case wherein adder 36 is used, the outputs of EX OR gates 41 vary at intervals. As a result, $2^n$ entries in TLB 31 are referred at intervals. Since EX OR gates can constitute an operation circuit whose operation speed is faster than that of an adder, the circuit is effective in the TLB control system wherein a high speed operation is required.

Although in FIG. 5, the contents of two fields 33 and 34 are added, the number of fields is not limited to two. The contents of more than three or four fields can be processed. For example, as shown in FIG. 8A, the contents of fields 33, 34, and 42 may be added by operation circuit 43, or may be EX-ORed. Furthermore, as shown in FIG. 8B, the contents of fields 33 and 34 may be processed by operation circuit 46, and the resultant value may be stored in a predetermined field in TLB address register 37. Thereafter, the contents of fields 44 and 45 are processed by operation circuit 47, and the resultant value is stored in another field in TLB address register 37.

Next, an actual structure and operation of the virtual memory control system according to an embodiment of the invention will be described with reference to FIG. 9 in detail.

Figure 9:
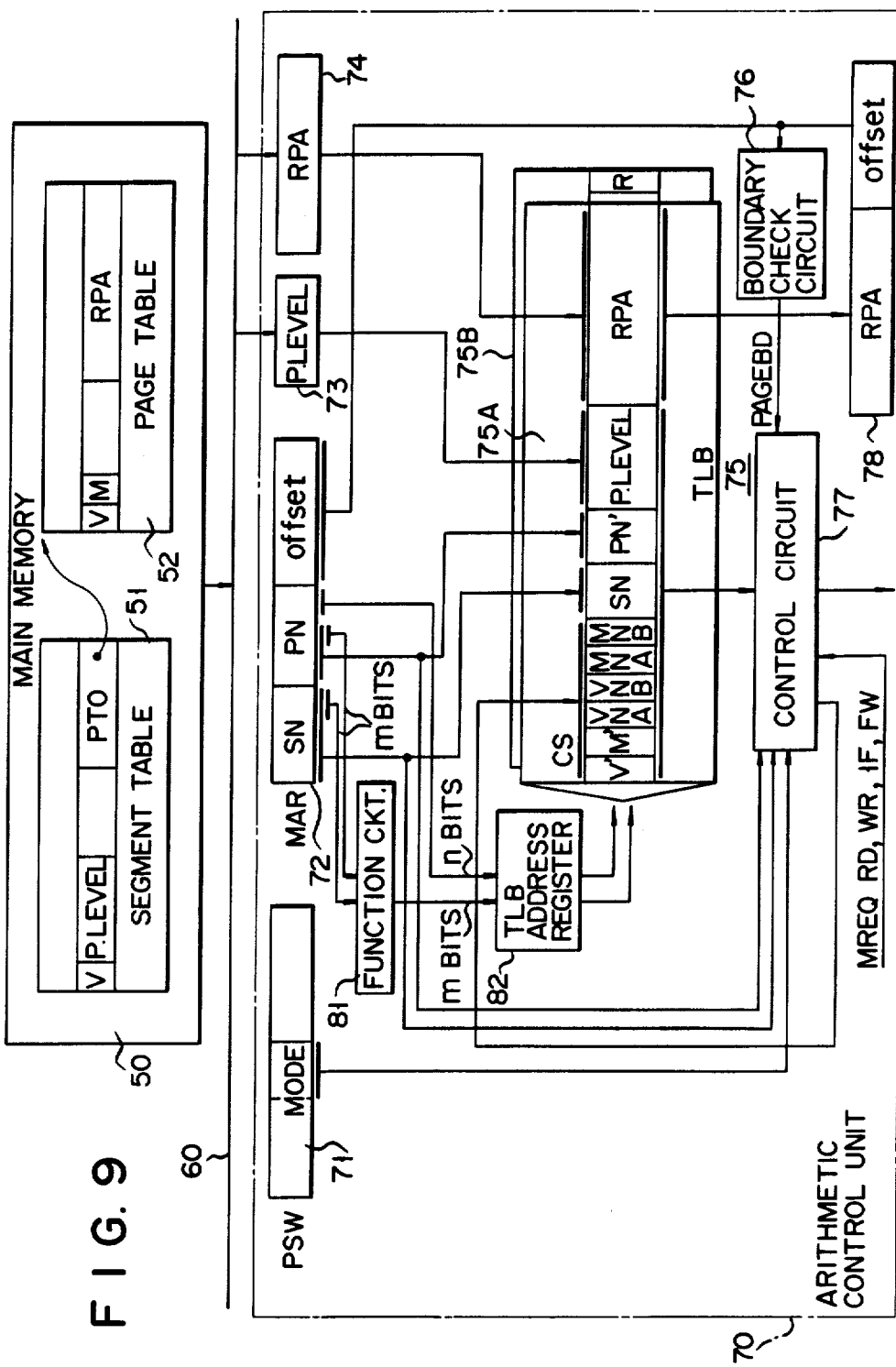
FIG. 9 is a view showing a detailed arrangement of the TLB control system according to the embodiment of the present invention.

In FIG. 9, a main memory 50 stores a segment table 51 representing segment data of a virtual address (memory) space, and a page table 52 representing page data in each segment. Each entry in the segment table 51 has fields of a valid bit V representing validity of the entry, main storage protection data P.LEVEL of the segment, and a page table start address PTO as the corresponding start address of the page table 52. Each entry of the page table 52 has fields of a valid bit V representing validity of the entry, a modify bit M indicating that the corresponding page has been rewritten, i.e., indicating that the content of the corresponding page in the virtual space must be updated to the content of the corresponding page in the main memory 50, and a real address RPA for translating a virtual address into a real address. An arithmetic control unit 70 is connected to the memory 50 through a data bus 60.

A program status word (PSW) register 71 in the arithmetic control unit 70 stores mode data MODE representing the program run mode (protection priority level). A memory address register (MAR) 72 stores a virtual address. The virtual address is logically divided into segment number SN, page number PN, and page offset OFFSET. A protection register 73 temporarily stores main storage protection data P.LEVEL stored in the entry of the segment table 51. An RPA register 74 temporarily stores a real page number RPA stored in the entry of the page table 52. A TLB 75 performs high speed translation of a virtual address into a real address. The TLB 75 consists of two TLBs 75A and 75B. TLB 75 is accessed by the contents of TLB address register 82. M bits data from function circuit 81 is stored in upper m-bit area of TLB address register 82. Lower n-bit data of page register PN is stored in lower n-bit area of register 82. Function circuit 81 receives lower m-bit data of section address SN, and the m-bit data preceding the n-bit data of page address PN. Each entry of the TLBs 75A and 75B has fields of control section CS, bits SN and PN', address translation data including RPA, and data P.LEVEL. The control section CS consists of bits V', M', VNA, VNB, MNA and MNB. The bit V' represents validity of the corresponding entry. The bits VNA and VNB represent validity of the entries of the TLBs 7A and 75B which correspond to the page next to the page of the current entry. The bit M' represents the state of the modify bit M of the entry in the page table 52 which corresponds to the currant page. The bits MNA and MNB represent the state of the modify bit M in the page table 52 which corresponds to the page next to the current page. The field SN corresponds to the segment number SN, and the field PN' corresponds to the upper remaining bit of the page number PN. Lower n bits of page number PN need not be stored in TLB 75, because the lower n bits of page number PN are used to address TLB 75, without being process. Each entry of the TLB 75B also has a reference bit R. The bit R represents which of the TLBs 75A and 75B has been least recently referred to.

A boundary check circuit 76 checks if a memory access involves a page boundary in accordance with the page offset OFFSET of the virtual address held in the MAR 72, and produces a signal PAGEBD representing the checking result. A control circuit 77 controls the TLB and the like. A register 78 holds a real address. The control circuit 77 receives the retrieval result from the TLB 75, i.e., the control section CS, bits SN and PN' and data P.LEVEL; the segment number SN and the upper bits of the page number PN of the virtual address held in the MAR 72, the signal PAGEBD from the page boundary circuit 76, and various memory control signals from a microprogram control section (not shown). The memory control signals include a signal MREQ requesting a memory access, a signal RD representing a memory read, a signal WR representing a memory write, a signal IF presenting an instruction fetch, and a signal FW representing a fullword access.

The mode of operation of the embodiment of the present invention will now be described. Assume that a virtual address is loaded in the MAR 72 in order to make a memory access to the main memory 50. The page offset OFFSET in the virtual address loaded in the MAR 72 is supplied to the boundary check circuit 76. When the memory access to the main memory is a fullword access, the circuit 76 checks if the memory access involves a page boundary. In this embodiment, 1 page consists of 2 k bytes and the number of bits of the offset OFFSET is 11. In this case, if a condition is a fullword access of a halfword boundary, the boundary check circuit 76 needs to check if the offset OFFSET is "7FE" (hexadecimal notation). The circuit 76 supplies to the control circuit 77, a signal PAGEBD representing the result of checking based on the offset OFFSET from the MAR 72.

Meanwhile, data of the lower m bits of the segment number SN and the m bits of page number PN of the virtual address loaded in the MAR 72, is supplied to function circuit 81. Linked data consisting of output data of function circuit 81 and lower n-bit data of page number PN is stored in TLB address register 82. Then, the storage data is read out from the entries of the TLBs 75A and 75B corresponding to the contents of register 82. Of the data read out from the TLB 75, V', M', VNA, VNB, MNA, MNB, SN, PN', P.LEVEL and R (R is read out only from the TLB 75B) are supplied to the control circuit 77. The segment number SN of the virtual address loaded in the MAR 72, the upper bit (PN') of the page number PN thereof, and MODE from the PSW 71 are also supplied to the MAR 72. In response to these input signals, the control circuit 77 generates signals MISS, PRT, MOD, NEXT:MISS, and NEXT:MOD. The signal MISS represents that the corresponding entry of the TLB 75 does not have correct address translation data for translating the virtual address into a real address; the signal MISS represents a TLB mishit. The signal PRT represents that the operation mode indicated in the PSW 71 does not have a memory access right to the corresponding segment (The signal PRT represents an illegal operation against main storage protection.) The signal MOD represents that the modify bit M of the corresponding entry of the page memory 52 is not set, a state called "modify". The signal NEXT:MISS represents that the TLB entry corresponding to the page next to the page to be accessed is not correctly created, indicating a next page mishit. The signal NEXT:MOD represents that the modify bit M of the page table entry corresponding to the page next to the page to be accessed is not set, indicating a next page modify. The creation logics of these signals are as follows.

I. MISS $$MISS = \overline{HIT}$$

$$HIT = HIT_A + HIT_B$$
$$HIT_i = V_i (SN = TLB_i(SN)) (PN' = TLB_i(PN'))$$

where SN and PN' represent the numbers SN and the upper bits of PN from the MAR 72, and $V_i$, $TLB_i(SN)$ and $TLB_i(PN')$ represent V, SN and PN' of the corresponding entry of the TLB $75_i$ (i=A, B). Therefore, HIT (i=A, B) indicates that correct address translation data is present in the corresponding entry of the TLB $75_i$. The HIT represents if correct address translation data is set in the TLB 75A or 75B, indicating a TLB hit.

II.
$$PRT$$
$$PRT = HIT_A (MODE \geq P.LEVEL_A) + HIT_B$$
$$(MODE \geq P.LEVEL_B)$$

where $P.LEVEL_i$ (i=A, B) indicates the data P.LEVEL of the corresponding entry of the TLB $75_i$.

III. MOD $$MOD = HIT_A \overline{MA} + HIT_B \overline{MB}$$

where $M_i$ (i=A, B) indicates the modify bit M of the corresponding entry of the TLB $75_i$.

IV. NEXT:MISS $$NEXT:MISS = HIT_A (\overline{VNA_A + VNB_A}) +$$
$$HIT_B (\overline{VNA_B + VNB_B})$$

where $VNA_i$ and VNB. (i=A, B) indicate the bits VNA and VNB of the corresponding entry of the TLB $75_i$.

V. NEXT:MOD $$NEXT:MOD = HIT_A (\overline{MNA_A + MNB_A}) +$$
$$HIT_B (\overline{MNA_B + MNB_B})$$

where $MNA_i$ and $MNB_i$ (i=A, B) indicate the bits MNA and MNB of the corresponding entry of the TLB $75_i$.

The signals in items I through V above, are supplied from the control circuit 77 to a microprogram control section (not shown), and are used to check validity of a memory access by the microprogram before the memory access is made.

In this embodiment, validity check of a memory access is also performed in the control circuit 77. The reason being that if the microprocessor is used to check a memory access in the case where the memory access is performed only once, e.g., in the case of a LOAD instruction, the processing speed is considerably decreased. In other words, the control circuit 77 checks the signals I through V, i.e., the validity from the microprogram control section by means of hardware. When the validity of the memory access cannot be guaranteed, the control circuit 77 requests an interrupt in the firmware level before executing the instruction. In this case, a mishit interrupt signal MISS:INT, an illegal main storage protection interrupt signal PRT:INT, a modify interrupt signal MOD:INT, a next page mishit interrupt signal NEXT:MISS:INT, and a next page modify interrupt signal NEXT:MOD:INT in accordance with the following logic:

| | |
|---|---|
| VI. | MISS:INT |
| | MISS:INT = MISS MREQ |
| VII. | PRT:INT |
| | PRT:INT = $\overline{\text{MISS}}$ PRT MREQ |
| VIII. | MOD:INT |
| | MOD:INT = $\overline{\text{MISS}}$ $\overline{\text{PRT}}$ MOD MREQ WR |
| IX. | NEXT:MISS:INT |
| | NEXT:MISS:INT = $\overline{\text{MISS}}$ $\overline{\text{PRT}}$ $\overline{(\text{MOD WR})}$ NEXT:MISS MEXT:MREQ |
| | NEXT:MREQ = MREQ PAGEBD FW |
| X. | NEXT:MOD:INT |
| | MEXT:MOD:INT = $\overline{\text{MISS}}$ $\overline{\text{PRT}}$ $\overline{\text{MOD}}$ $\overline{\text{NEXT:MISS}}$ NEXT:MOD NEXT:MREQ WR |

As can be seen from the above signals VI to X have the interrupt priority. In the above case, the mishit interrupt (VI) has the highest priority, the signals VII and VIII have next highest priority, and the signal X (next page modify) has the lowest priority.

When a mishit is detected in accordance with the above logic, the control circuit 77 replaces the corresponding entry in the TLB 75 under the control of the microprogram control section, as will be described later. In the case of an illegal operation against main storage protection, an interrupt signal is generated at the software level. In the case of a modify (interrupt), as will be described, the modify bit M of the corresponding entry of the page table 52 is set, as are the corresponding entries of the TLBs 75A and 75B. In the case of a next page mishit, as in the case of a mishit, the corresponding entries of the TLBs 75A and 75B are replaced in accordance with the operation sequence shown in FIGS. 10 and 11. In the case of a next page modify, as in the case of the operation sequence in a modify (interrupt) shown in FIG. 12, the modify bit M of the corresponding entry of the page table 52 is set, and the contents of the TLB 75 are updated. The next mishit and the next page modify can be generated in the case of a fullword access involving a page boundary.

Replace of the entries of the TLBs 75A and 75B, and updating of the contents of the TLBs 75A and 75B will be described below. In the following description, the virtual address loaded in the MAR 72 is called an object virtual address, and an entry of the TLB 75, corresponding to the object virtual address, is called a TLB corresponding entry. A TLB entry set corresponding to a page immediately preceding the object virtual address, is called a TLB previous entry set, and a TLB entry set corresponding to a page immediately after the object virtual address, is called a TLB succeeding entry set.

Figure 10:
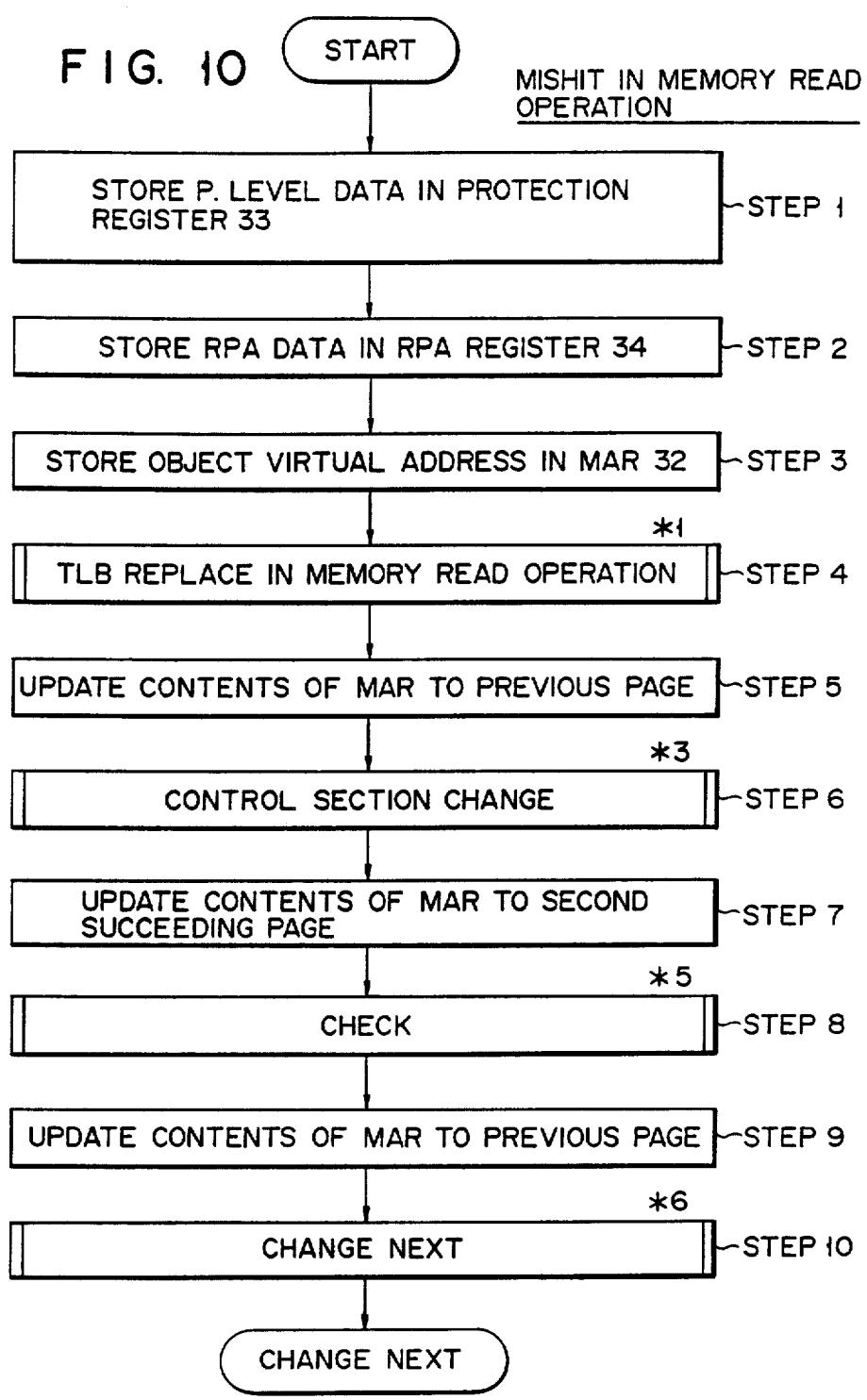
FIGS. 10 to 13F are flow charts for explaining an operation of the arrangement shown in FIG. 9.

(1) Mishit in memory read operation (FIG. 10)

When a mishit interrupt is requested in a memory read operation, the main storage protection data P.LEVEL in the corresponding entry of the segment table 51 is loaded (STEP 1) in the protection register 73 under the control of the microprogram control section. The real page number RPA in the corresponding entry of the page table 52 is loaded in the RPA register 74 (STEP 2). The data P.LEVEL is obtained by accessing the segment table 51 in accordance with the segment start address stored in the segment table start register (not shown) and with the segment number SN of the virtual address. At this time, the page table start address is also obtained. The real page address RPA is obtained by accessing the page table 52 in accordance with the page table start address and the page number PN of the virtual address. The object virtual address is then stored in the MAR 72 (STEP 3).

When the data P.LEVEL and RPA are stored in this manner, a TLB replace command (read) is generated by the microprogram (STEP 4). In response to this command, among the entries of the TLBs 75A and 75B, the least recently referred entry, e.g., an entry of the TLB 75A is rewritten.

Figure 13A:
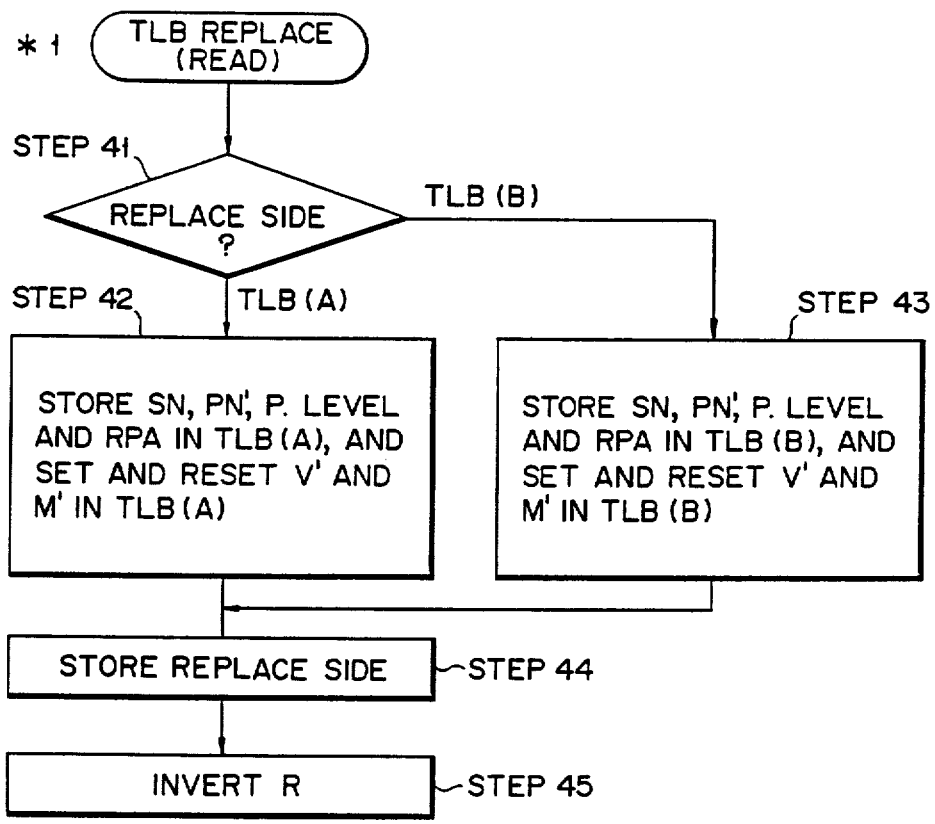
Figure 13B:
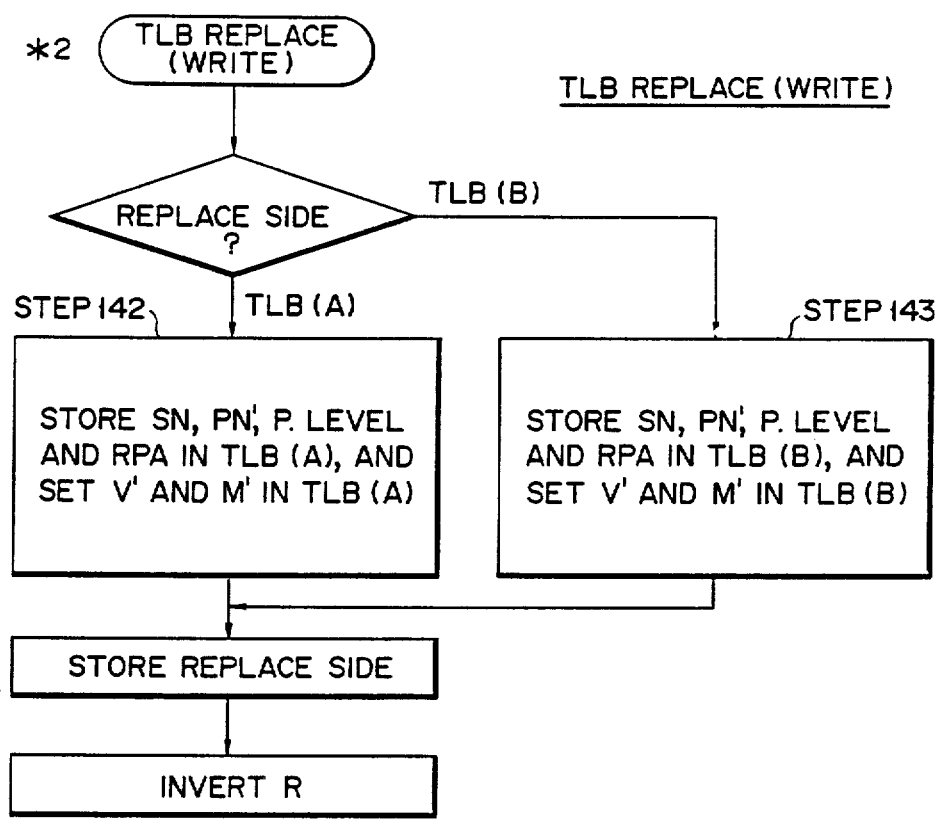
Figure 13D:
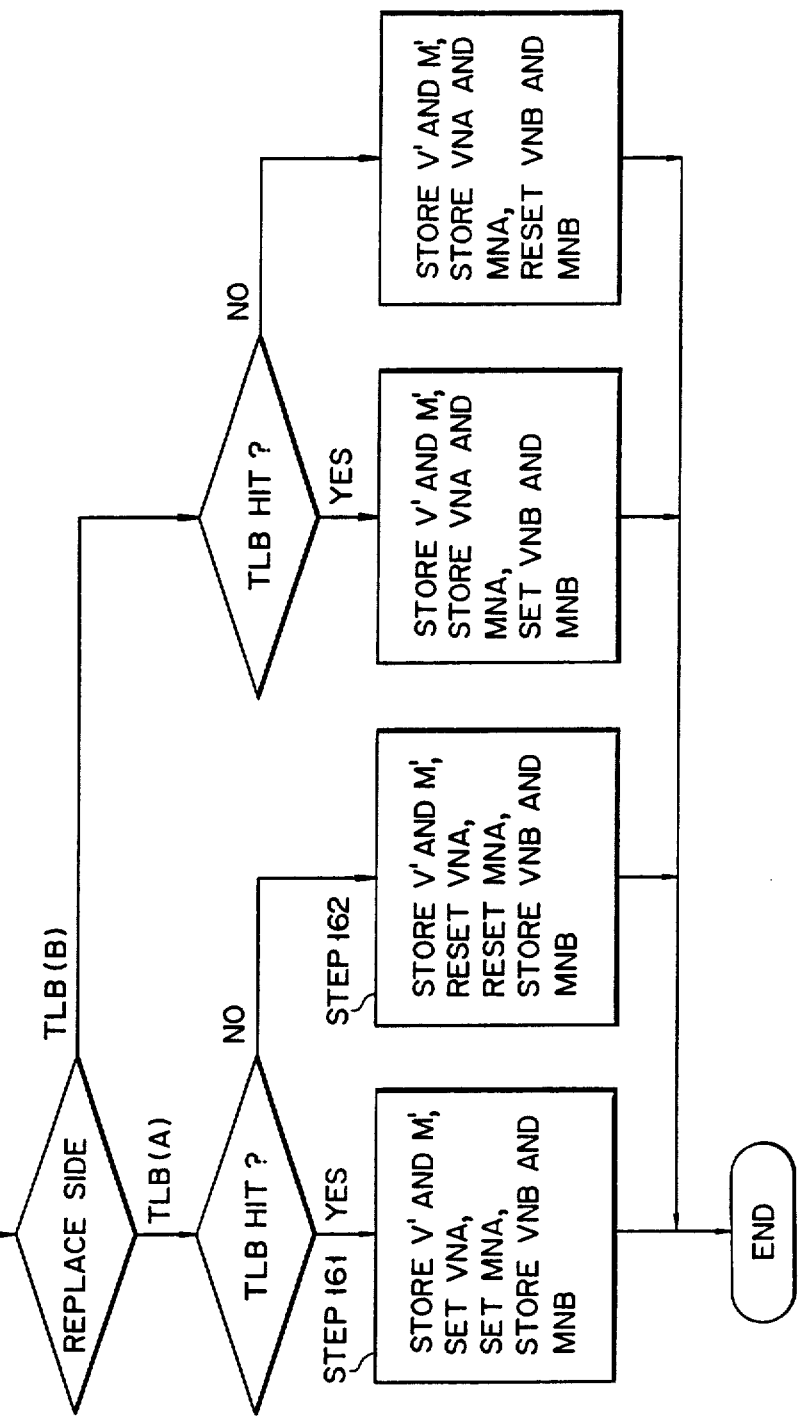

The operation sequence when a TLB replace (read) command is generated, is shown in FIG. 13A. Which one of the TLBs 75A and 75B is to be rewritten or replaced is determined in accordance with the reference bit R in the corresponding entry of the TLB 75B (STEP 41). In this replace operation, the bits SN and PN' of the object virtual address, the data P.LEVEL from the protection register 73, and the address RPA from the RPA register 74 are written in predetermined fields of the TLB corresponding entry. The bit V' and the bit M' of the corresponding entry are set and reset, respectively, and the bits VNA, VNB, MNA, and MNB are kept unchanged (STEP 42 or 43). The TLB subjected to entry replace (A in this case) is stored (STEP 44). The logical value of the reference bit R is inverted (STEP 45).

After replace operation, the contents of the MAR 32 are changed to correspond to a page immediately preceding the object virtual address (STEP 5), and a control section change (read) command is generated (STEP 6). In response to this command, the control section CS of the TLB previous entry set is updated as shown in FIG. 13C. The updating content of the control section CS varies in accordance with whether the current case is a TLB hit in which the TLB previous entry set has correct address translation data corresponding to the virtual address set in the MAR 72 (virtual address corresponding to a page preceding the object virtual address), or a TLB miss in which the TLB previous entry set does not have such correct address translation data. The following description is made with reference to a case wherein an entry of the TLB 75A is replaced in response to a TLB replace (read) command.
(a) TBL hit (STEP 61)

| V: not changed | VNA: set V', M': stored |
|---|---|
| VNB: not changed (reset) | |
| M: not changed | MNA: reset |
| MNB: not changed (reset) | VNB, MNB: stored |

(b) TLB miss (STEP 62)

| V: not changed | VNA: reset V', M': stored |
|---|---|
| VNB: not changed | |
| M: not changed | MNA: reset |
| MNB: not changed | VNB, MNB: stored |

Similarly, when an entry in the TLB 75B is replaced, STEP 63 or 64 is executed.

Figure 13E:
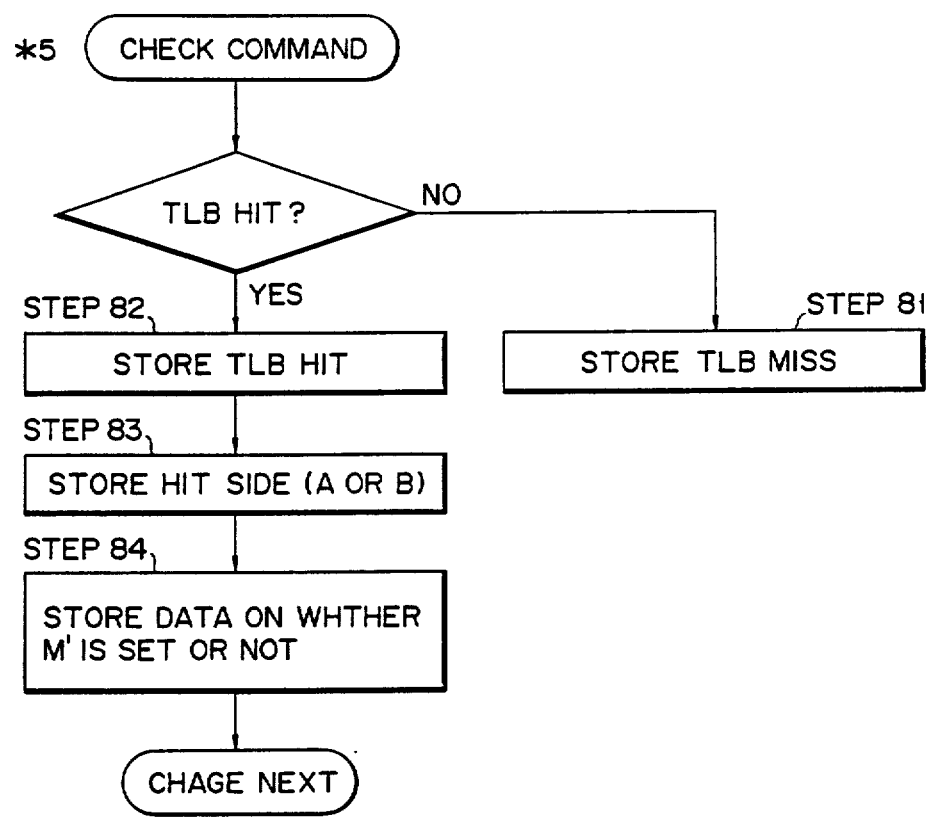

When updating of the control section CS of the TLB previous entry set is completed, the content of the MAR is changed to indicate a page immediately after the object virtual address (STEP 7), and a check command is generated (STEP 8). In response to this command, the TLB succeeding entry set is checked. In particular, as shown in FIG. 13E, it is checked if the case is a TLB hit or a TLB miss and if the bit M is set. In the case of a TLB miss, the TLB miss is stored, and checking of the bit M becomes non-significant (STEP 81). When a TLB hit is detected upon this checking, after the TLB hit is stored (STEP 82), the hit TLB number (TLB 75A or 75B) is stored (STEP 8). The set/reset state of the bit M is also stored (STEP 84).

Figure 13F:
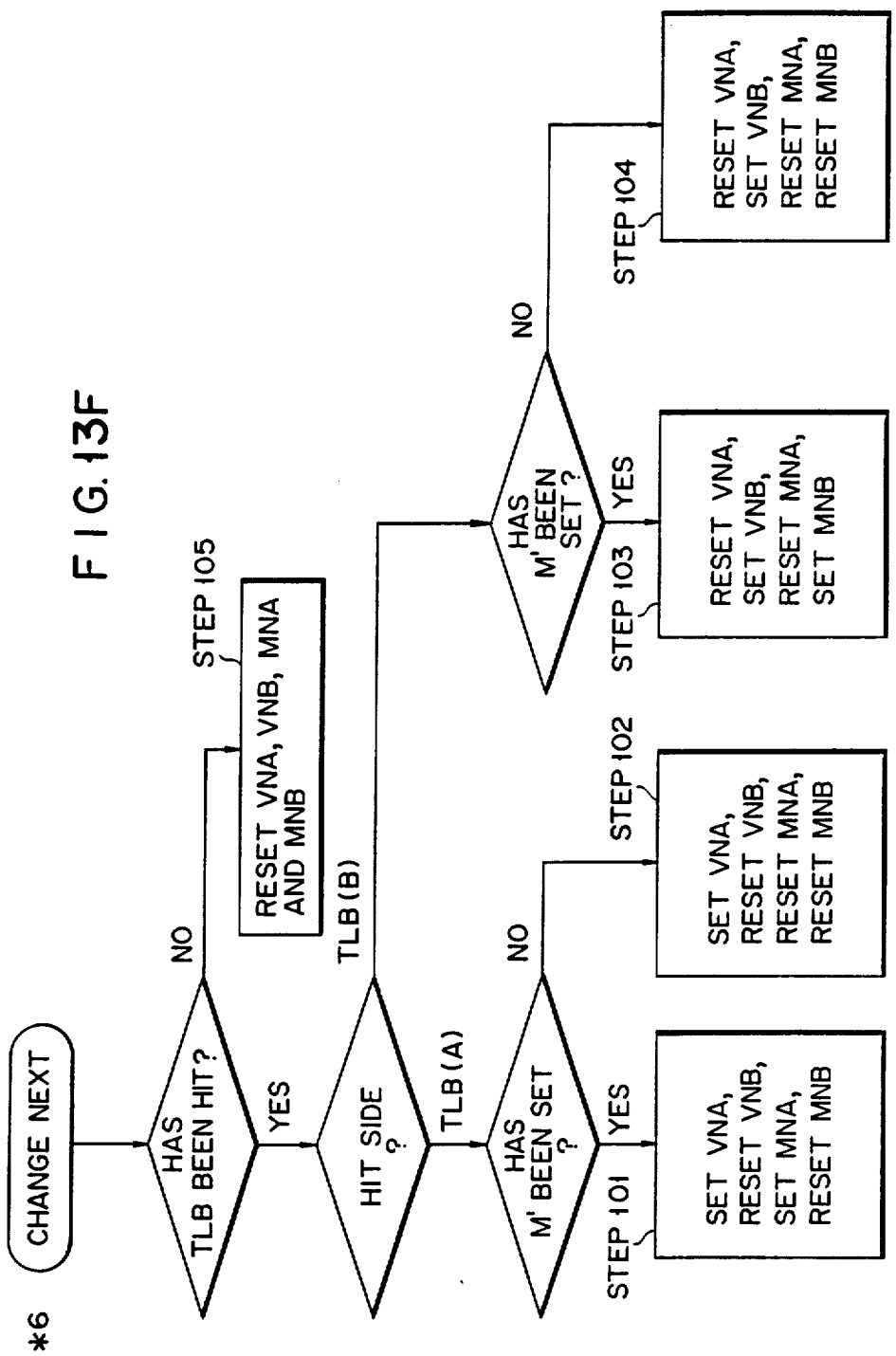

When checking of the TLB succeeding entry set is completed, the content of the MAR 72 is changed to correspond to a previous page to return to the object virtual address (STEP 9), and a change next command is generated (STEP 10). In response to this command, the bits VNA, VNB, MNA and MNB, kept unchanged upon replacing the TLB corresponding entry, are set at correct values as shown in FIG. 13F. At this time, data obtained by execution of the check command is utilized. Thus,
(a) TLB hit (B side) detection by check command

| a-(1) Bit M' is reset (STEP 104) | |
|---|---|
| VNA: reset | VNB: set |
| MNA: reset | MNB: reset |
| a-(2) Bit M' is set (STEP 103) | |
| VNA: reset | VNB: set |
| MNA: reset | MNB: set |

When a TLB hit (A side) is detected in response to a check command, STEP 101 or 102 is executed.
(b) TLB miss detection by check command (STEP 105)

| VNA: reset | VNB: reset |
|---|---|
| MNA: reset | MNB: reset |

Figure 11:
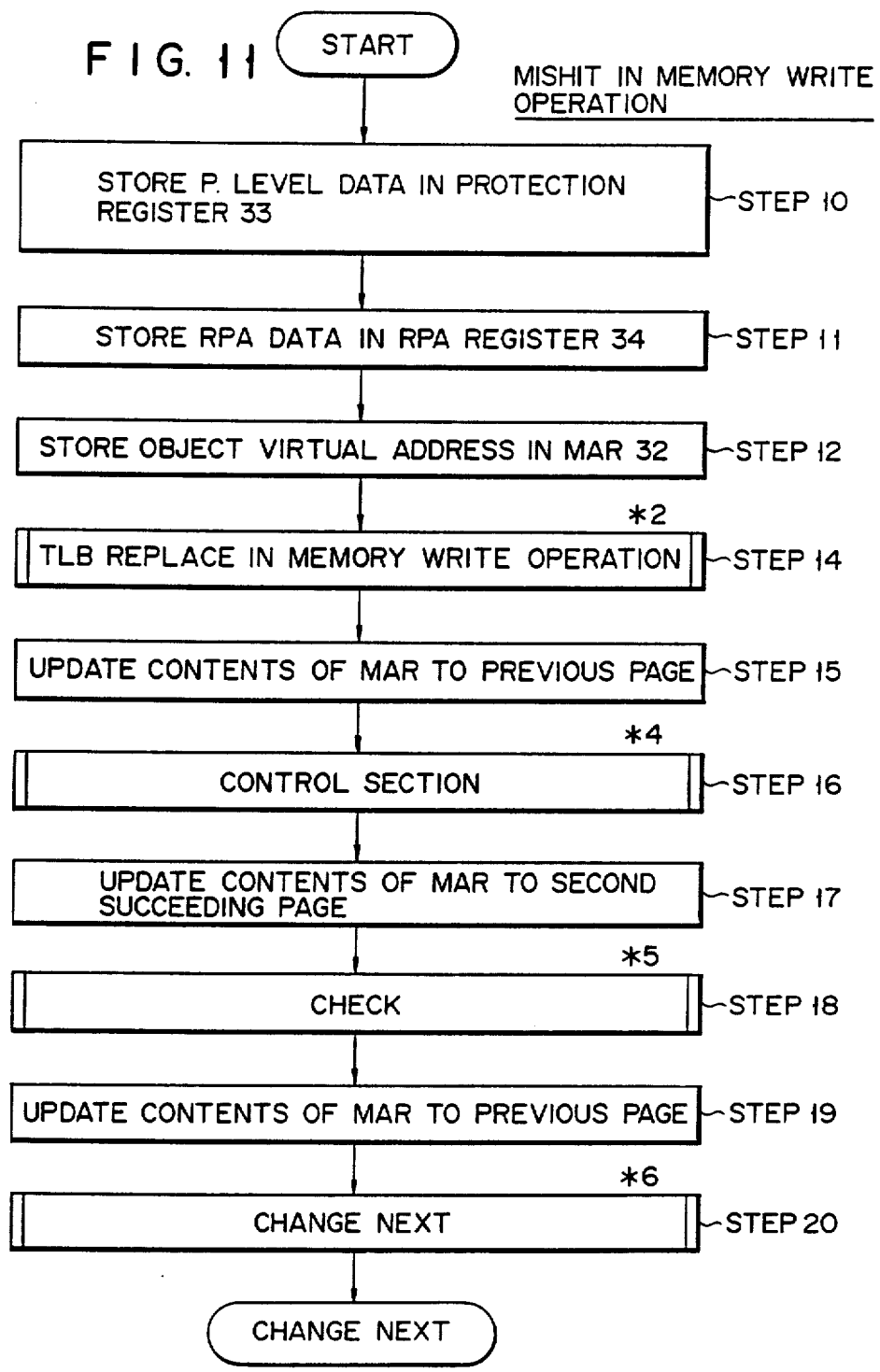

(2) Mishit in memory write operation (FIG. 11)

The TLB control sequence in the case of a mishit (interrupt) in the memory write operation is the same as that in the memory read operation, except that a TLB replace (write) command (STEP 14) is used in place of the TLB replace (read) command in item (1) above, a control section change (write) command is used in place of the control section change (read) command (STEP 16), and the modify bit M' of the corresponding entry of the page table 52 is set (STEP 142 or 143). In this case, the control sections CS of the corresponding entry and the TLB previous entry set are as follows:
(a) TLB corresponding entry (STEP 142 or 143)

| V: set | VNA: * |
|---|---|
| VNB: * | |
| M: set | MNA: * |
| MNB: * | |

*indicates the same setting as in the case of the memory read operation.

(b) TLB previous entry set
When the A side is replaced:

| b-(1) TLB hit (STEP 161) | |
|---|---|
| V: not changed | VNA: set V', M': stored |
| VNB: not changed (reset) | |
| M: not changed | MNA: set |
| MNB: not changed (reset) | VNB, MNB: stored |
| b-(2) TLB miss (STEP 162) | |
| V: not changed | VNA: reset |
| VNB: not changed | V', M': stored |
| M: not changed | MNA: reset |
| MNB: not changed | VNB, MNB: stored |

Figure 12:
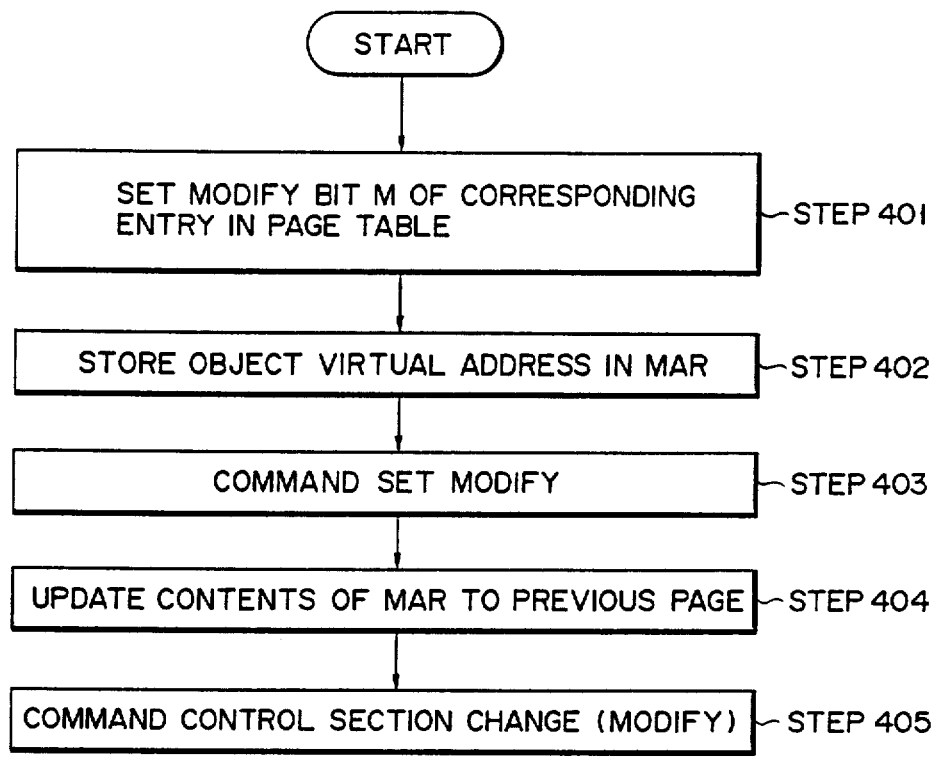

(3) Modify interrupt in memory write operation (FIG. 12)

When a modify interrupt is requested in the memory write operation, the modify bit M of the corresponding) entry of the page table 52 is set (STEP 401). Then, the object virtual address is set in the MAR 72 (STEP 402), and the set modify command is generated (STEP 403). In response to this command, the bit M of the TLB corresponding entry (in this case, the TLB 75A) is set. The content of the MAR 72 is changed to indicate a page immediately preceding the object virtual address (STEP 404), and the control section change (modify) command is generated (STEP 405). In response to this command, the control section CS of the TLB previous entry set is updated. The updated content of the control section CS is different in accordance with if the TLB previous entry set has correct address translation data which corresponds to the virtual address indicating a page immediately preceding the virtual address (object virtual address) set in the MAR 72, i.e., a TLB hit, or if it does not have such correct address translation data, i.e., a TLB miss. The following exemplifies a case wherein the bit M of the corresponding entry of the TLB 75A is set by a set modify command.
(a) TLB hit

| V: not changed | VNA: not changed (set) |
|---|---|
| VNB: not changed | |
| M: not changed | MNA: set |
| MNB: not changed | |

(b) TLB miss

| V: not changed | VNA: not changed (reset) |
|---|---|
| VNB: not changed | |
| M: not changed | MNA: not changed (reset) |
| MNB: not changed | |

In this case, the control section CS of the TLB corresponding entry is not influenced by the TLB succeeding entry set content.

In accordance with the TLB control described above, the control section CS of each entry of the TLB 75 stores updated data corresponding to the current page and the next page. For example, when a mishit (interrupt) occurs in a memory read operation by a given virtual address, the TLB corresponding entry is replaced. At this time, not only the bits V and M are uniquely set at correct values, but also the bits VNA, VNB, MNA, and MNB are updated to correctly reflect the state of the TLB succeeding entry set (by checking the TLB succeeding entry set). When the TLB corresponding entry is replaced, the bits VNA, VNB, MNA and MNB of the TLB previous entry set are updated to reflect the state of the TLB corresponding entry.

The above operation corresponds to the case of a fullword access involving a page boundary. When correct address translation data is not stored for either page, the TLB entry is updated in the following manner. In this case, as can be seen from the interrupt priority, processing, as in the case of a mishit, is performed. The TLB corresponding entry of the first page is replaced (including updating of the control section CS), and the control section CS (VNA, VNB, MNA, and MNB) of the TLB previous entry set is updated. When the fullword access is made at this point, processing for a next page mishit is performed. In this case, the TLB corresponding entry of the next page is replaced (including updating of the control section CS), and the control section (VNA, VNB, MNA, and MNB) of the TLB previous entry set, i.e., the TLB corresponding entry of the first page is updated. As a result, data indicating that correct address translation data is stored, both in this entry and the TLB succeeding entry set, is stored in the TLB corresponding entry which corresponds to the first page.

When a memory write access to the page in which the TLB corresponding entry is replaced is made by a mishit in the memory read operation, if an illegal main storage protection does not occur, a modify interrupt is requested, and the bit M of the TLB corresponding entry is set. At this time, the control section CS (MN$_i$) of the TLB previous entry set is updated to reflect the state of the TLB corresponding entry. The modify bit M of the corresponding entry of the page table 52 is also set. When it is desired to decrease the number of setting operations for the modify bit M of the page table 52 without using a modify interrupt of the corresponding entry of the page table 52, processing for modify (interrupt), mishit (interrupt) corresponding to next page modify (interrupt), and next page mishit is performed. However, in this case, since a replace of the TLB entry is performed, access to the segment table 51 and the page table 52 must be performed. Therefore, the efficiency in this case is lower than the system described above.

The embodiment is described with reference to a case wherein only one type of main storage protection data P.LEVEL is used. However, the present invention is not limited to this. For example, in order to efficiently perform main storage protection, three types of main storage protection data for protecting read, write and instruction execution can be prepared. In this case, illegal main storage protection is detected using main storage protection data corresponding to the type of each memory access.

What is claimed is:

1. A translation lookaside buffer control system in a computer using a virtual memory control system, comprising:

virtual address storing means for storing a virtual address;

arithmetic operation means, coupled to said virtual address storing means, for receiving contents of predetermined first and second fields of the virtual address, which do not overlap each other in said virtual address storing means and for performing a predetermined operation with respect to the received contents;

TLB address storing means, coupled to said arithmetic operation means and said virtual address storing means, for storing linked data including contents of a third field, which does not overlap the first and second fields in said virtual address storing means and output data from said arithmetic operation means;

translation lookaside buffer means, coupled to said TLB address storing means, adapted to be addressed by contents of said TLB address storing means, and adapted to store address translation data in each entry including pairs of a virtual address and a physical address, for translating a virtual address into a physical address in each entry;

control means, coupled to said virtual address storing means and said translation lookaside buffer means, for determining whether a virtual address specified by the address translation data stored in the entry of said translation lookaside buffer means designated by the contents of said TLB address storing means coincides with the virtual address stored in said virtual address storing means and for replacing the address translation data in a corresponding entry of said translation lookaside buffer means when the virtual address does not coincide; and main memory means, coupled to said control means, for storing data for translating virtual addresses to physical addresses, wherein said control means includes means for obtaining the address translation data for translating the virtual address stored in said virtual address storing means to a physical address in accordance with the data stored in said main memory means and means for storing the obtained address translation data in an entry of said translation lookaside buffer means, said entry of said translation lookaside buffer means being designated by the contents of said TLB address storing means, when said control means determines that the addresses do not coincide.

2. A system according to claim 1, wherein the first fields are constituted by a plurality of m-bit fields which do not overlap each other, and the second field is an n-bit field less than a least significant field of the first fields and continuous with the least significant field.

3. A system according to claim 2, wherein the virtual address includes a segment number, a page number, and an offset number, the first field is constituted by a field including the least significant bits of the segment number and a field including m bits of the page number, and the second field includes the least significant n bits of the page number.

4. A system according to claim 3, wherein each entry of said translation lookaside buffer means stores the segment number, bits of the page number which are not included in the least significant n bits, and the physical address.

5. A system according to claim 2, wherein the virtual address includes a segment number, a page number, and an offset number, and each of the first fields includes part of the segment number, while the 6. A system according to claim 5, wherein each entry of said translation lookaside buffer means stores the segment number and a physical number.

7. A system according to claim 1, wherein said arithmetic operation means comprises an adder.

8. A system according to claim 1, wherein said arithmetic operation means comprise exclusive OR circuits.

9. A translation lookaside buffer control system in a computer using a virtual memory control system, for translating, at high speed, a virtual address into a physical address, comprising:

a virtual address register for storing a virtual address;

an arithmetic operation circuit, coupled to said virtual address register, for receiving contents of predetermined first and second fields of the virtual address which do not overlap each other and for performing a predetermined operation with respect to the received contents;

a TLB address register, coupled to said arithmetic operation circuit and said virtual address register, for storing as upper bits data output from the arithmetic operation circuit, and storing as lower bits contents of a third field less significant than the first and second fields of said virtual address register;

a translation lookaside buffer, coupled to said TLB address register, adapted to be addressed by contents of said TLB address register, and adapted to store address translation data in entries including pairs of a virtual address and a physical address, for translating a virtual address into a physical address in each entry;

a main memory for storing data for translating the virtual address into the physical address;

a determination circuit, coupled to said translation lookaside buffer and said virtual address register, for determining whether a virtual address specified by the address translation data stored in the memory designated by the contents of said TLB address register coincides with the virtual address stored in said virtual address register; and replacing means, coupled to said determination circuit, said translation lookaside buffer, and said main memory, for obtaining the address translation data for translating the virtual address stored in said virtual address storing means to the physical address in accordance with data stored in said main memory and for replacing the address translation data stored in an entry of said translation lookaside buffer which is designated by the contents of said TLD address register with the obtained address translation data when said determination circuit detects that the virtual addresses do not coincide with each other.

10. A system according to claim 9, wherein said arithmetic operation circuit comprises an adder.

11. A system according to claim 9, wherein said arithmetic operation circuit comprises exclusive OR circuits.

12. A translation lookaside buffer control system in a computer using a virtual memory control system, comprising:

translation lookaside buffer means having a plurality of entries, for storing address translation data in each entry;

virtual address storing means for storing a virtual address to be translated, said stored virtual address having at least three independent fields used for designating the entries in said translation lookaside buffer means;

operation means, coupled to said virtual address storing means, for performing an operation on contents of a first and a second field of the three fields in said virtual address storing means, and for generating part of an address for accessing said translation lookaside buffer means; and means for referring to the entries in said translation lookaside buffer means by using an operation result of said operation means.

13. A system according to claim 12, wherein said operation means comprises an adder.

14. A system according to claim 12, wherein said operation means comprises exclusive OR circuits.

* * * * *